United States Patent [19]

Jelalian et al.

[11] Patent Number: 4,721,385
[45] Date of Patent: Jan. 26, 1988

[54] FM-CW LASER RADAR SYSTEM

[75] Inventors: Albert V. Jelalian, Bedford; Wayne H. Keene, Medfield; Charles M. Sonnenschein, Brookline; Clarke E. Harris; Clifford E. Morrow, both of Wayland, all of Mass.

[73] Assignee: Raytheon Company, Lexington, Mass.

[21] Appl. No.: 940,156

[22] Filed: Dec. 9, 1986

Related U.S. Application Data

[63] Continuation of Ser. No. 733,846, Feb. 11, 1985, abandoned, which is a continuation of Ser. No. 353,446, Mar. 1, 1982, abandoned.

[51] Int. Cl.$^4$ .......................... G01C 3/08; G01C 1/00; G01B 11/26
[52] U.S. Cl. ...................................... 356/5; 356/28.5; 356/141; 356/152
[58] Field of Search ................... 356/5, 28.5, 141, 152

[56] References Cited

U.S. PATENT DOCUMENTS

| | | | |
|---|---|---|---|
| 3,484,167 | 12/1969 | Burns, Jr. | 356/5 |
| 3,647,298 | 3/1972 | Soules | 356/5 |
| 3,802,775 | 4/1974 | Hughes | 356/4 |
| 3,825,340 | 7/1974 | Debart | 356/5 |
| 3,841,755 | 10/1974 | Debart | 356/5 |
| 3,872,407 | 3/1975 | Hughes | 332/7.51 |
| 3,968,492 | 7/1976 | Kaplan | 343/14 |
| 4,025,193 | 5/1977 | Pond et al. | 356/152 |
| 4,167,329 | 9/1979 | Jelalian et al. | 356/5 |
| 4,184,154 | 1/1980 | Albanese | 343/9 R |
| 4,270,862 | 6/1981 | Hewitt | 356/152 |

OTHER PUBLICATIONS

"Introduction to Radar Systems"; M. I. Skolnik; McGraw-Hill Book Co., Inc., 1962; Sec. 3.3 Frequency-Modulated CW Radar; pp. 86–103.

Primary Examiner—Stephen C. Buczinski
Attorney, Agent, or Firm—Christopher L. Maginniss; Richard Sharkansky

[57] ABSTRACT

A scanning laser radar system utilizing a frequency modulated (fm)-continuous wave (cw) beam to coherently detect echo signal returns from an object in a predetermined region. The frequency of the beam is repeatedly changed as a function of time to produce a symmetrical triangular-shaped frequency modulated waveform. The echo signals received are frequency shifted, as a function of range and Doppler shift, from the signal being transmitted at that time. The frequency shift is detected by homodyning a portion of the instantaneous transmitted signal with the received echo signal to produce an output signal having a frequency which is substantially constant during a portion of the frequency modulation period. The constant frequency portion of the output signal is related to the range and Doppler speed of the target. Target information such as range, Doppler speed, intensity and angle information are derived by processing the output signal. The signal to noise ratio of the output signal is improved by using a frequency modulation period greater than the scanning time across an arc of a size equal to a predetermined multiple of the beamwidth because with such relationship the time duration of the constant amplitude portion of the output signal is increased. Further, with such arrangement, because of the relatively long modulation period, the ambiguity in detection of the range to the target is reduced. The system is particularly useful in terrain following or obstacle avoidance applications.

18 Claims, 18 Drawing Figures

FM-CW LASER RADAR SYSTEM

This application is a continuation of application Ser. No. 733,846 filed Feb. 11, 1985 which is a continuation of application Ser. No. 353,446, filed Mar. 1, 1982 now abandoned.

BACKGROUND OF THE INVENTION

In one type of continuous wave (cw) radar ranging system, a frequency modulated signal is transmitted and directed toward a target and the signals reflected therefrom are collected and are then mixed with a portion of the modulated transmitted signal to obtain an output signal. The output signal has a frequency proportional to the distance, or range, between the transmitter and the target. As is well known in the art, the difference frequency between the frequency of the received signal and the frequency of the transmitted signal is proportional to the range of a target since the signal received back from the target is delayed in time with respect to the modulated transmitted signal being continuously produced. The amount of the delay in time is a function of the range of the target and thus the difference frequency provides a measure of target range.

As is also known in the art, microwave radar ranging systems of this type are limited in the minimum detectable target size by the size of the beam used since the signal to noise ratio (S/N) of the output signal is a function of the ratio of the cross-sectional area of the target to the cross-sectional area of the beam at the target. Thus, microwave radar systems of such type are generally not practical for obstacle avoidance applications wherein the obstacles are of relatively small size and the antenna required for detection of such small targets would be of unreasonably large size, particularly when such radar systems is used in an airborne application.

In order to detect relatively small targets, laser radar systems have been suggested because lasers may provide a sufficiently small beam having controlled divergence suitable for detecting these relatively small targets. However, in order to detect a relative small target at a reasonable range, a sufficiently high scanning rate is generally required, in order to scan or search a reasonably sized field of view. This high scanning rate requirement, however, produces at maximum range, a very short overlap time between the return signal and the instantaneous transmitted signal resulting in a relatively low signal to noise (S/N) ratio in the output signal.

SUMMARY OF THE INVENTION

In accordance with the present invention, a FM-CW (frequency modulated-continuous wave) laser radar system is provided, comprising means for generating an electromagnetic beam of a predetermined beamwidth, means for frequency modulating said beam, and means for scanning said beam through a predetermined region, the modulation period being equal to or greater than the scan time through an arc equal to the beamwidth. In a preferred embodiment of the invention, the system includes means for receiving reflected portion of the modulated beam and means for mixing the reflected portions of the beam with an instantaneous portion of the modulated beam, to produce a beat frequency or output signal which includes target information. The system also includes means for averaging the beat frequency signals during a portion of the modulation period in order to increase the S/N of the resulting signal.

With such arrangement, a scanning laser radar system is provided wherein a frequency modulated (fm)-continuous wave (cw) beam is used to coherently detect echo signal returns from an object in a predetermined region. The frequency of the beam is repeatedly changed as a function of time to produce a symmetrical triangular-shaped frequency modulated waveform. The echo signals received are frequency shifted, as a function of range and Doppler shift, from the signal being transmitted at that time. The frequency shift is detected by homodyning a portion of the instantaneous transmitted signal with the received echo signal, to produce an output signal having a frequency which is substantially constant during a portion of the frequency modulation period. The constant frequency portion of the output signal is related to the range and Doppler speed of the target. Target information such as range, Doppler speed, intensity and angle information are derived by processing the output signal. The signal to noise ratio of the output signal is improved by using a frequency modulation period greater than the scanning time across an arc of a size equal to a predetermined multiple of the beamwidth because with such relationship the time duration of the constant amplitude portion of the output signal is increased. Further, with such arrangement, because of the relatively long modulation period, the ambiguity in detection of the range to the target is reduced. The system is particularly useful in terrain following or obstacle avoidance applications.

BRIEF DESCRIPTION OF THE DRAWINGS

These and other objects and advantages of the invention will be better understood from the following detailed description used in conjunction with the drawings and in which.

DESCRIPTION OF THE PREFERRED EMBODIMENT

Figure 1:
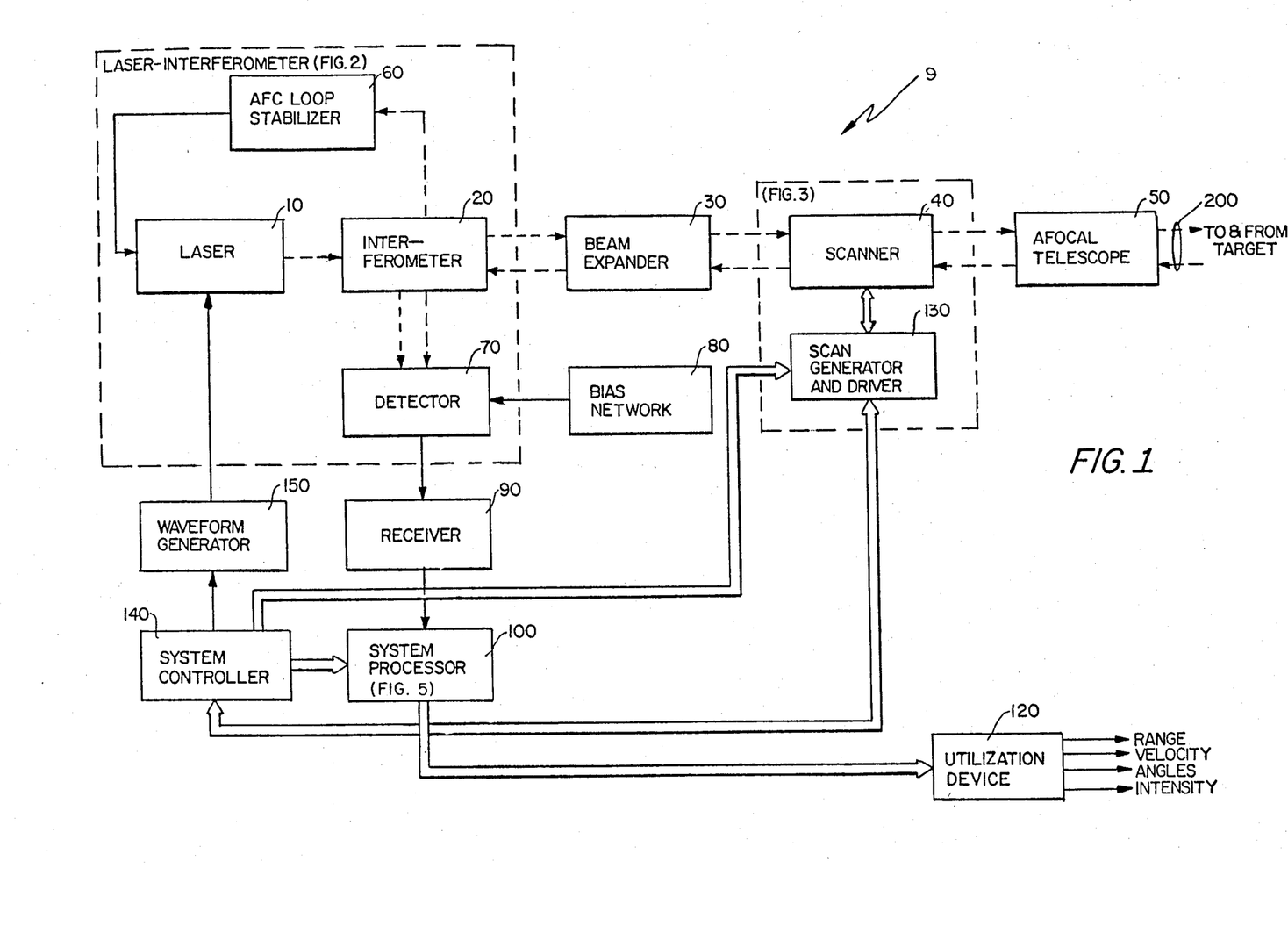
FIG. 1 is block diagram for the FM-CW laser radar system according to the present invention.

Referring now to FIG. 1, there is shown a radar system 9 including a laser 10 for producing a coherent beam of electromagnetic energy which is then transmitted through interferometer 20 to a beam expander 30. Laser 10 comprises any known type of laser which will meet the requirements of the required application, and here, for a selected wavelength in the infrared range, a preferred type is a $CO_2$ laser producing a diffraction limited beam at at a nominal operating frequency corresponding to the 10.6 microns transition. The beam expander 30, which here is a narrow-field-of-view telescope, is used to expand or increase the diameter of the laser produced beam. The expanded beam is transmitted through scanner 40 to an afocal telescope 50 for transmission to the outside environment, and is shown as the outgoing portion of beam 200. For the detection of targets in a predetermined field of view, afocal telescope 50 has a wide-field-of-view, since it must accommodate a scanning beam as its input. A first portion of the generated laser beam is reflected from interferometer 20 and is used by Automatic Frequency Control (AFC) loop stabilizer 60 for controlling the frequency of laser 10, as is well known in the art. This step is optional and is only required if the laser is expected to operate over a wide temperature range. A second portion of the generated laser beam is also reflected by interferometer 20 and is used as the local oscillator beam.

Those portions of the transmitted beam that are reflected by targets present in the field of view are returned, as shown by the incoming portion of beam 200, through afocal telescope 50 and through scanner 40 to beam expander 30 which in this case serves to compress or decrease the diameter of the return beam to the diameter similar to that of the transmitted beam. The compressed returned beam is passed through interferometer 20 and is then directed to homodyne detector 70. Detector 70 is used to mix or homodyne the return signals with the local oscillator signal which is derived from a portion of the instantaneous transmitted beam. Detector 70 is a mercury cadmium telluride (HgCdTe) photovoltaic detector and is biased for proper operation by a bias network 80. Detector 70 is cooled to the appropriate operating temperature in a suitable vessel, as is well known in the art. The output of detector 70 is a homodyned signal having as a frequency component thereof a beat frequency equal to the difference in the frequencies of the transmitted signal and the return signal. The homodyned signal is processed by receiver 90 to filter out and amplify the beat frequency signal to thereby detect target range and Doppler speed.

Figure 2:
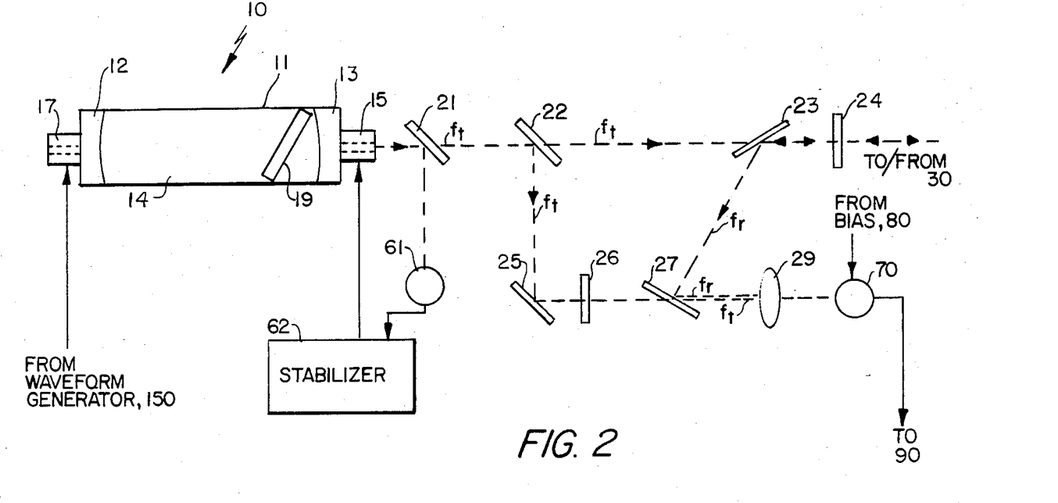
FIG. 2 is diagram of a laser-interferometer section of the radar system of FIG. 1.

Referring now to FIG. 2, laser 10 and interferometer 20 are shown in more detail. Laser 10 comprises an envelope 11, mirror 12 and partially transmitting output mirror 13 which form the optical resonant cavity including a suitable gain medium 14. Output mirror 13 is mounted on a hollow cylindrical piezoelectric stack 15 which is used to accurately position mirror 13. A CW laser beam is generated by the pumping means of laser 10, not shown in the FIG. 2, which in the case of a CW $CO_2$ laser may comprise longitudinal discharge electrodes connected to a suitable power supply, as is well known in the art. The laser beam thus generated is linearly polarized (p-polarized by this example) by a Brewster angle polarizer 19.

The first portion of the laser beam from laser 10 which is reflected by beamsplitter 21 is directed toward detector 61. The electrical signal produced by detector 61 is then coupled to stabilizer 62 to maintain the frequency stability of laser 10 by controlling the position of mirror 13 with piezoelectric stack 15 and thereby adjust for any change in the optical length. Stabilizer 62 superimposes an AC signal, typically having a frequency of 1 kHz, on the DC positioning signal normally applied to stack 15 in order to scan about the center of the selected laser transition and generate an error signal to control the DC positioning signal applied to PZT stack 15. This is done periodically during operation of the system to maintain laser 10 at the center of the selected transition. A commercially available unit, a Lansing Research Company Model 80214, may be used as stabilizer 62.

The beam transmitted through beamsplitter 21 is then directed to beamsplitter 22, where the second portion is reflected to be used as the local oscillator beam. The transmitted portion of the beam is directed through a Brewster angle polarizer 23 to quarter wave plate 24, to change the polarization of the p-polarized beam to left-circular polarization. The left-circularly polarized beam is now transmitted through the rest of the optical system for transmission to targets in the field of view, as described hereinabove. Upon reflection from targets, the polarization of the reflected beam is mainly changed to right-circular polarization. A portion of the reflected beam is then collected by the optical system, and the right-circular polarization of the collected beam is changed to linear by quarter wave plate 24. The linear polarization is now perpendicular to the plane of incidence of the beam and the beam is referred as being s-polarized. The received s-polarized beam is now reflected by Brewster angle polarizer 23 toward beam combiner 27.

The portion of the beam reflected from beamsplitter 22 is directed by mirror 25 through half-wave plate 26, which is used to rotate the plane of polarization of the p-polarized reference beam to match the s-polarization of the target reflected return beam. The polarization-corrected local oscillator beam is now combined with the return beam by beam combiner 27 and the optically combined beam is focussed by a lens 29 upon the surface of detector 70.

The output beam of laser 10 is frequency modulated by systematically sweeping the resonant frequency of the cavity, here effected by changing the optical length. Referring back to FIGS. 1 and 2, a frequency modulation corresponding to a symmetrical ramp is accomplished by cyclically oscillating mirror 12 about its stabilized position for a given laser transition. System controller 140 controls waveform generator 150 to provide piezoelectric stack 17 with a driving signal corresponding to a triangular waveform of the selected amplitude and period. This forces the resonant frequency of the cavity to be scanned through a fraction of the free spectral range for the laser used. Other frequency modulation means may be employed, such as an electro-optic crystal inside the laser cavity. System controller 140 controls the modulation period of waveform generator 150, which is changed in response to an operator selection, as described hereinbelow.

Referring now to FIGS. 3A–D, there is shown a more detailed view of scanner 40 and scan generator and driver 130. Scanner 40 comprises a fixed mirror 42 which is used to deflect the laser beam, which is propagating along the Z direction from beam expander 30, along the Y axis toward the reflecting surface 48 of a first scanning mirror 44. Mirror 44 then reflects the beam along the X-axis to the reflecting surface 45 of a second scanning mirror 46. It is noted that the portion of the beam obscured by the back of non-reflecting surface 47 is shown dotted. Scanning mirror 44 oscillates back and forth through a predetermined angular range about the Z-axis to provide a Y-axis scan. Scanning mirror 46 oscillates back and forth through a second predetermined angular range about the Y-axis to provide an X-axis scan. This particular arrangement of mirrors results in the laser beam which may be considered as emanating from surface 45 of mirror 46 and scanned in the X-Y plane. Of course it should be realized that even though the beam has been described as being transmitted through scanner 40 to afocal telescope 50 for transmission, scanner 40 is simultaneously reflecting return beams from targets toward the optical train for detection by detector 70, that is transmission and reception occur simultaneously.

Figure 3A:
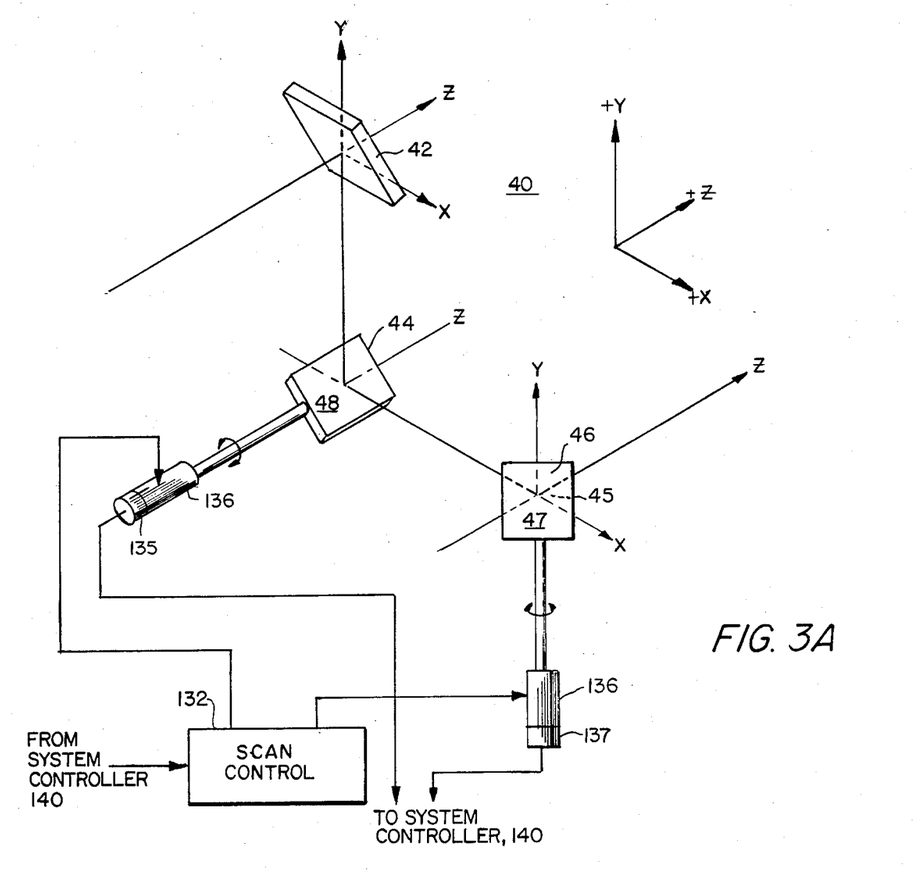
FIGS. 3A–3D are diagrams of the scanner-scan generator used in the radar system of FIG. 1.
Figure 3B:
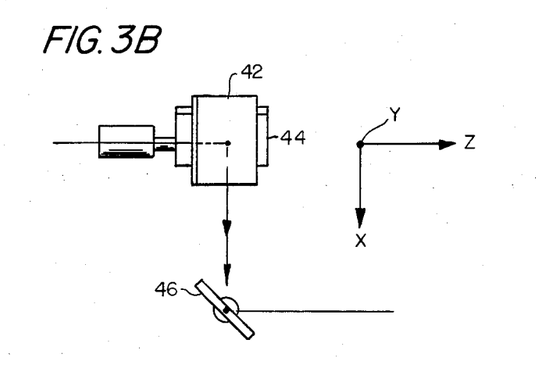
Figure 3C:
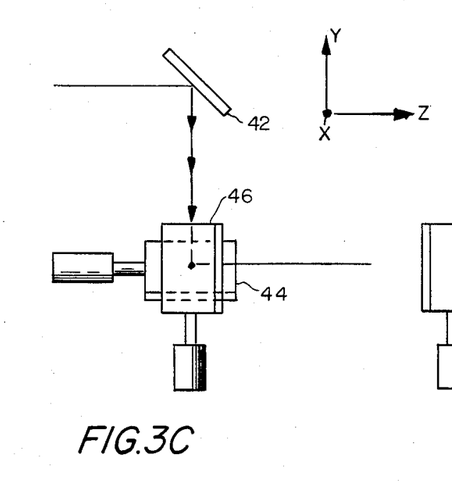
Figure 3D:
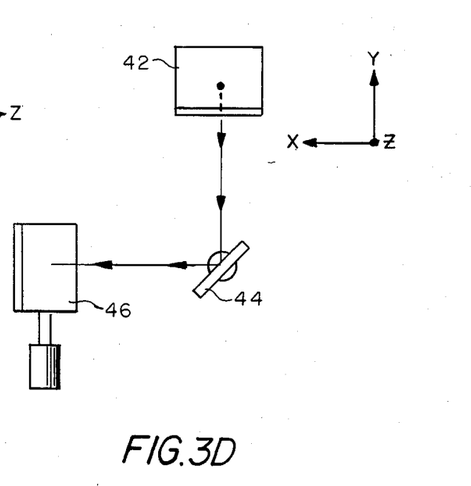
Figures 4A, 4B, 4D:
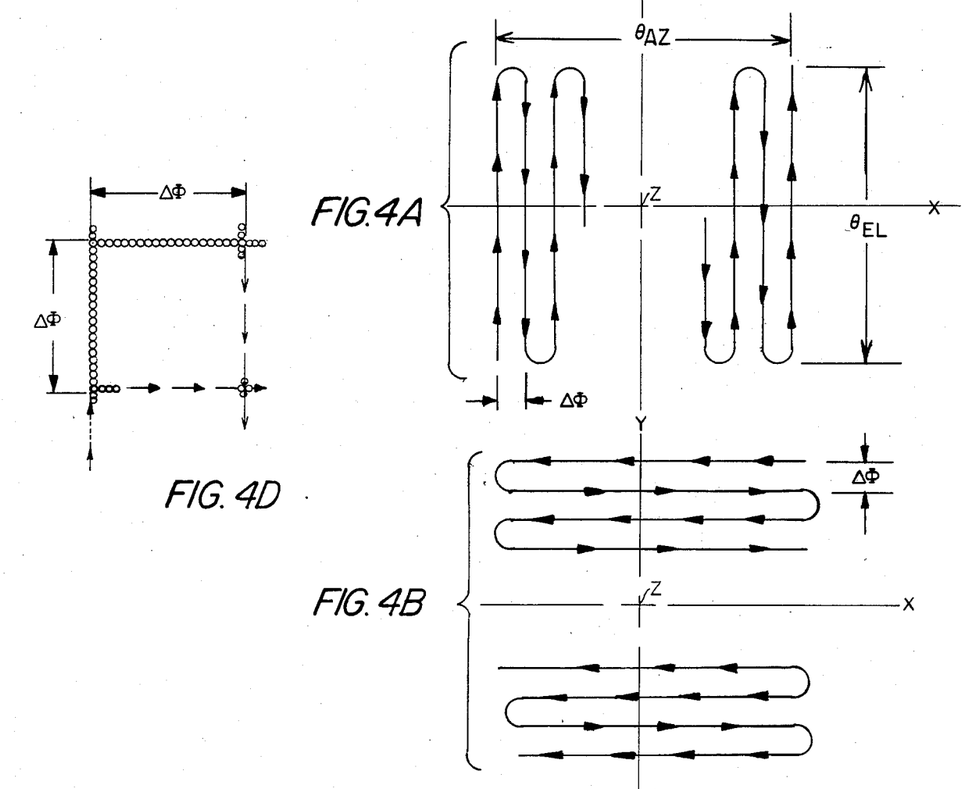
FIGS. 4A–4D are drawings of the scanning pattern used in the radar system of FIG. 1.
Figure 4C:
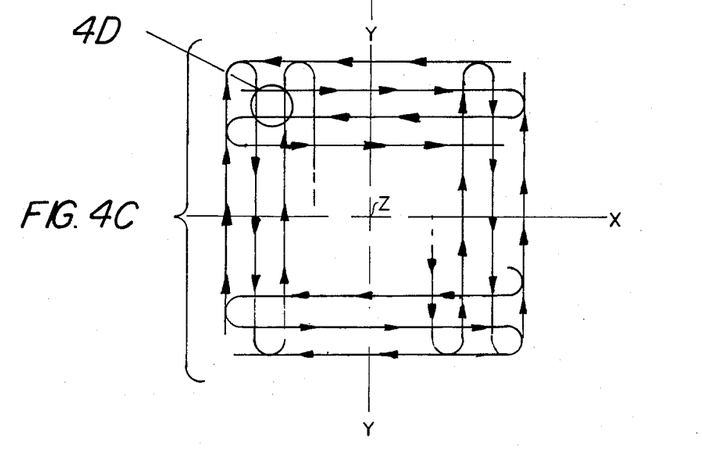

For obstacle avoidance applications, it is advantageous to employ a line scan such as the one shown in FIGS. 4A-4D. During a first time interval which defines a first frame of the scan, the beam is scanned through the field of interest in parallel elevation lines (i.e. parallel to the Y-axis) as depicted in FIG. 4A. The elevation lines are separated by angular extent $\Delta\Phi$ corresponding to the smallest detectable target size at the range of interest. During a second time interval which defines a second frame of the scan, the beam is scanned along the same field in parallel azimuth lines (i.e. parallel to the X-axis) as shown in FIG. 4B. These lines are also separated by the same angular extent as described above. This scanning pattern results in a grid shown in FIG. 4C, with the typical resolution cell as shown in FIG. 4D. The resolution cell has a size selected such that targets of interest, for example power transmission lines and towers, span more than one resolution cell in order to ensure their detection. The coordinated movement of mirrors 44 and 46 to generate the required scanning pattern is controlled by scan control 132 which supplies the appropriate driving signal to electromechanical means such as galvanometers 134 and 136, respectively. The actual position of mirrors 44 and 46, which is used to determine elevation and azimuth of the detected targets, is available through synchronizers 135 and 137, respectively, which are coupled to system controller 140, as shown in FIG. 3A.

The difference or beat frequency signal produced at the output of receiver 90 (FIG. 1), is then processed by signal processor 100, the details of which will be described in connection with FIG. 5. Suffice it to say here that signal processor 100 includes a filter bank to detect or determine the frequency of the beat frequency signal. Other means, such as, a spectrum analyzer or a fast fourier transform (FFT) processor, may be used to determine the frequency of the beat frequency. The frequency of the beat frequency signal provides an indication of the target range and Doppler speed. The signal processor 100 converts the detected frequency into range and Doppler velocity data. The processor 100 also provides data indicating intensity of the received signal and the target bearing. The data output signal produced by the processor 100 is then fed to utilization device 120, here a display for presentation of such data to an operator.

Figure 6A:
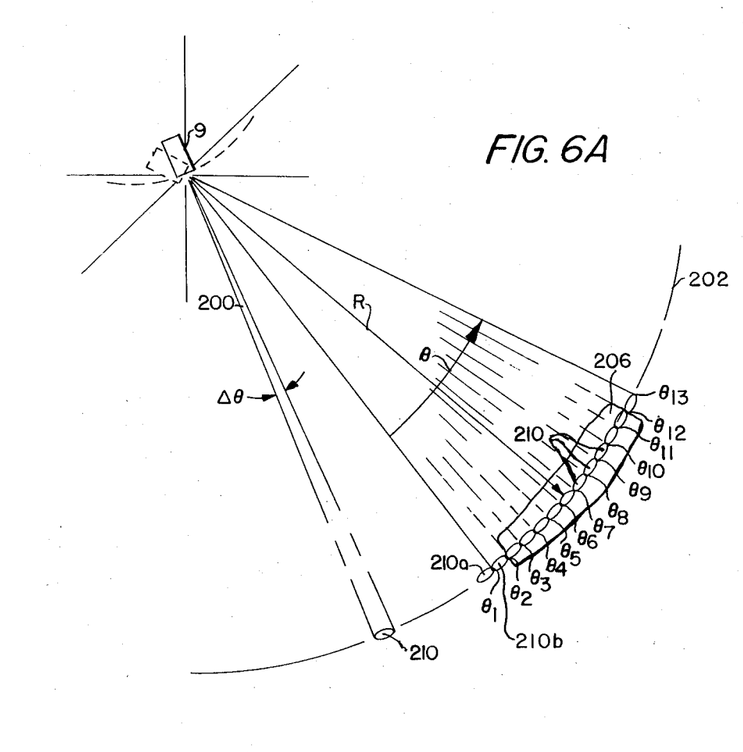
FIG. 6A is a drawing illustrating the radar system scanning across a target in a region of interest.
Figure 6B:
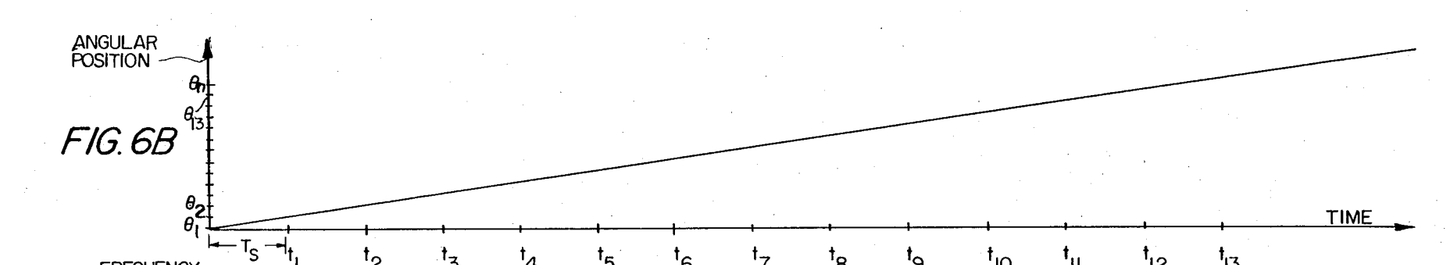
FIGS. 6B to 6F are timing diagrams of signals produced by the radar systems of FIG. 1 useful in understanding the operation of such radar systems.
Figures 6C, 6D:
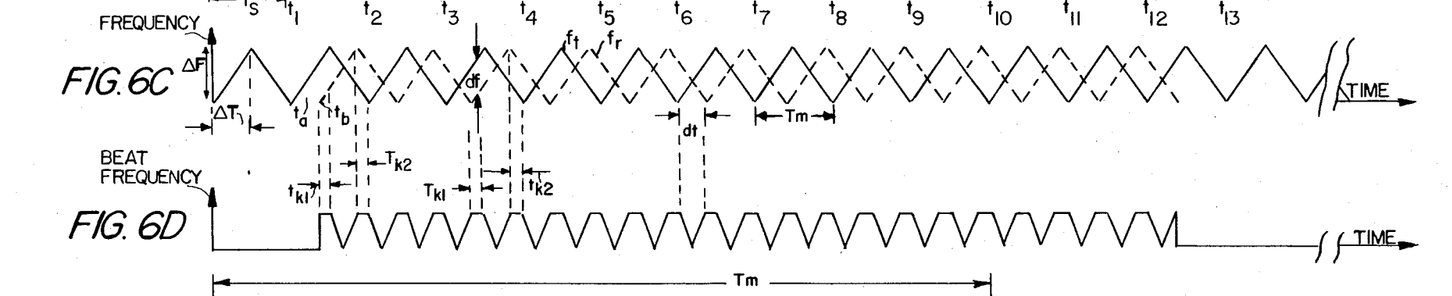

Referring now again to FIG. 1 and to FIGS. 6A-6F, an example to illustrate the operation of the system is described. Laser radar system 9 generates a coherent beam of electromagnetic energy 200 having a predetermined amount of divergence or angular beamwidth $\Delta\theta$. The beamwidth, $\Delta\theta$, is determined, as is well known, by the optical characteristics of the expander 30 and the afocal telescope 50 (FIG. 1). The generated beam 200 is frequency modulated by waveform generator 150 (FIG. 1), which is in turn controlled by the system controller 140. The frequency modulation changes the operating frequency of the laser linearly over a predetermined bandwidth $\Delta F$ in a first time interval, $\Delta T$, which has a value of one half the modulation period, shown as $T_m$ in FIG. 6C (i.e. $\Delta T = T_m/2$). For a frequency modulation corresponding to a symmetrical ramp or triangular waveform, as shown in FIG. 6C, the frequency of the transmitted signal, $f_t$, alternatively increases linearly and decreases linearly at a predetermined rate, $1/T_m$, set by the waveform generator 150, and established by the target resolution requirements of the laser radar system.

Figure 6E:
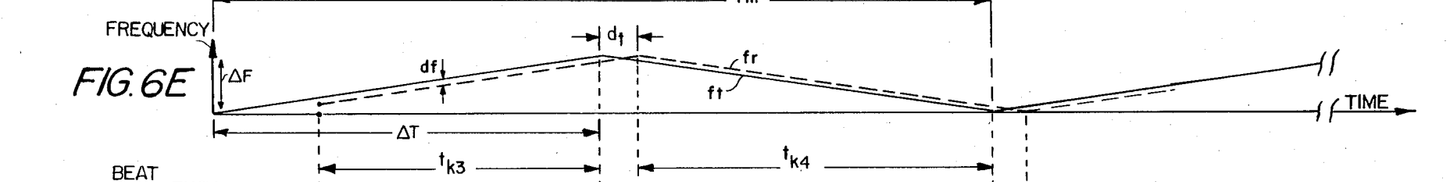
Figure 6F:
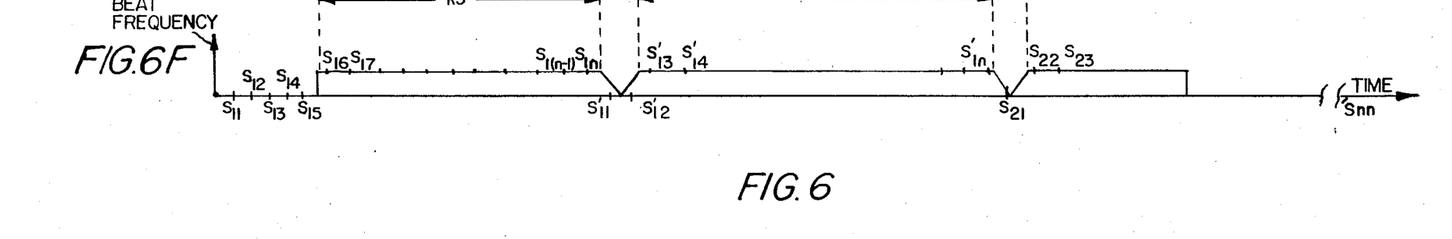

Referring now to FIGS. 6A-D, the beam 200 passes through angular positions $\theta_1$-$\theta_{13}$ as it is scanned over a predetermined field of the view by scanner 40 at a constant scanning speed W (radians per second). Footprints 210 are shown at range R illuminating a swath, or along an arcuate scanline, 202. Each footprint has an angular extent, or arc, equal to the beamwidth, or $\Delta\theta$. A portion of swath 202 equal in size to a footprint is then scanned in a time interval $T_s$, where $T_s$ is equal to the beamwidth divided by the scanning speed W, (i.e. $T_s = \Delta\theta/W$. At time $t_0$, (FIGS. 6B-6D) scanner 40 (FIG. 1) will be directing beam 200 toward swath 202 so that the leading edge of beam 200 is just illuminating a point on swath 202 defined by angular position $\theta_1$, as shown for footprint 210a. Since no targets are encountered in that orientation, there will be no return signal. Scanner 40 continues to uniformly sweep the beam in swath 202, and at time $t_1$, the leading edge of footprint 210, is pointing in the direction $\theta_2$, as shown for footprint 210b. However, no energy arrives at point on swath 202 at range R until sometime later, here time $t_a$ (FIGS. 6B-6D) the time delay being equal to the propagation delay through a distance equal to the range. At time $t_a$, the leading edge of footprint 210 is reflected by the point at angular position $\theta_2$ on target 206. The reflected beam is received by the system at time $t_b$, after a time delay again equal to the propagation delay. The reflected beam returns at time $t_b$ through the scanner and related optics to detector 70 where it is mixed with a portion of the instantaneous transmitted signal operating as the local oscillator signal. The frequency of the local oscillator signal, $f_t$, will have increased or decreased in value from the frequency of the return signal, $f_r$, by an amount, df, which corresponds to the round trip delay time, dt, of the transmitted signal which is now received, that is, $dt = 2R/c$, where R is the range and c is the speed of light. The frequency difference is proportional to the slope of the modulation waveform times the round trip delay, in other words, $df = (\Delta F/\Delta T) dt$. The range is then given by the following expression $R = df (\Delta T/\Delta F) (c/2)$. For the example shown in FIG. 6A, the beam is scanned past a target having a dimension in the path of the scan equal to 10 footprints. Thus, target 106 returns a signal for as long as it is illuminated by a portion of beam 200, which occurs until the leading edge of the beam is swept angular past position $\theta_{13}$, here at time $t_c$. The frequency of the homodyne signal (i.e. the output of detector 70, FIG. 1) produced for the scanning of swath 202 is shown in FIG. 6D. As can be appreciated from FIG. 6C and D, the modulation frequency, or conversely the modulation period $T_m$, is such that a complete frequency sweep is performed during a scan time $T_s$, which is equal to $\Delta\theta/W$. In other words a complete frequency sweep occurs during the scan time required to position the beam between adjacent footprints as long as the modulation period $T_m$ is equal to or greater than the scan time $T_s$, that is $T_m \geq T_s$. Here the return signal and local oscillator signal produce a beat frequency which is constant during a portion of both the up-sweep and down-sweep cycles of the modulation period. However, for targets at the far end range of the system the constant beat frequency is produced for a very small portion, $t_{k1}$ and $t_{k2}$ in FIG. 6D, of the frequency modulation period. For applications such as obstacle avoidance systems, the relatively small beam size and the high scanning rate normally required for obstacle avoidance in a reasonable field of view result in a relatively small scan time on target, $T_s$, for each beam position, also called footprint. Since a complete sweep of the frequency range must be made within the available time on target for each footprint, the maximum unambiguous range, which is inversely proportional to the modulation frequency, is also limited. The system of the present invention provides that for each modulation period, the frequency of the transmitted signal is swept as the beam is scanned. The short time on target problems are avoided with a selection of a modulation frequency that is much lower than otherwise required and which results in one complete frequency sweep occurring during the scan of an arc corresponding to a plurality of footprints. FIGS. 6B-F illustrate the effects of choosing two different modulation periods on the homodyned signal. Referring now to FIGS. 6E-F, the modulation period $T_m$, is equal to an integer multiple, here shown as 10, of the scan time, $T_s$, through a distance corresponding to one footprint. This means that the beam is swept through a region corresponding to one footprint in a time interval $T_s$ which is shorter than the time interval, $T_m$, over which the operating frequency is swept. This results in a composite homodyned signal which is generated from adjacent footprints and therefore is constant over a much greater portion, $t_{k3}$ and $t_{k4}$ in FIG. 6F, of the frequency modulation period, thus resulting in an improved S/N ratio. It should be realized that since this system is averaging several returns from adjacent targets, the minimum resolution cell has a size equal to the number of footprints scanned in each modulation period. The output signal could be misleading if the beam is scanned across a target whose size is smaller than the minimum resolution cell, since in this case, only a portion of the homodyned signal will represent this target of interest. However, this situation may be compensated for by the system since it allows an operator to select on system controller 140 the number of adjacent footprints to be integrated, and consequently increase the possibility of detection of smaller targets in those situations where they may be encountered.

This mode of operation may be made possible, in response to the operator's selection, by controlling waveform generator 150 to set the modulating frequency such that its period is equal to the number of footprints selected by the operator on an input panel of system controller 140. System controller 140 also enables signal processor 100, and more specifically computer 108 in FIG. 5, to integrate only the signals corresponding to the number of footprints selected.

Figure 5:
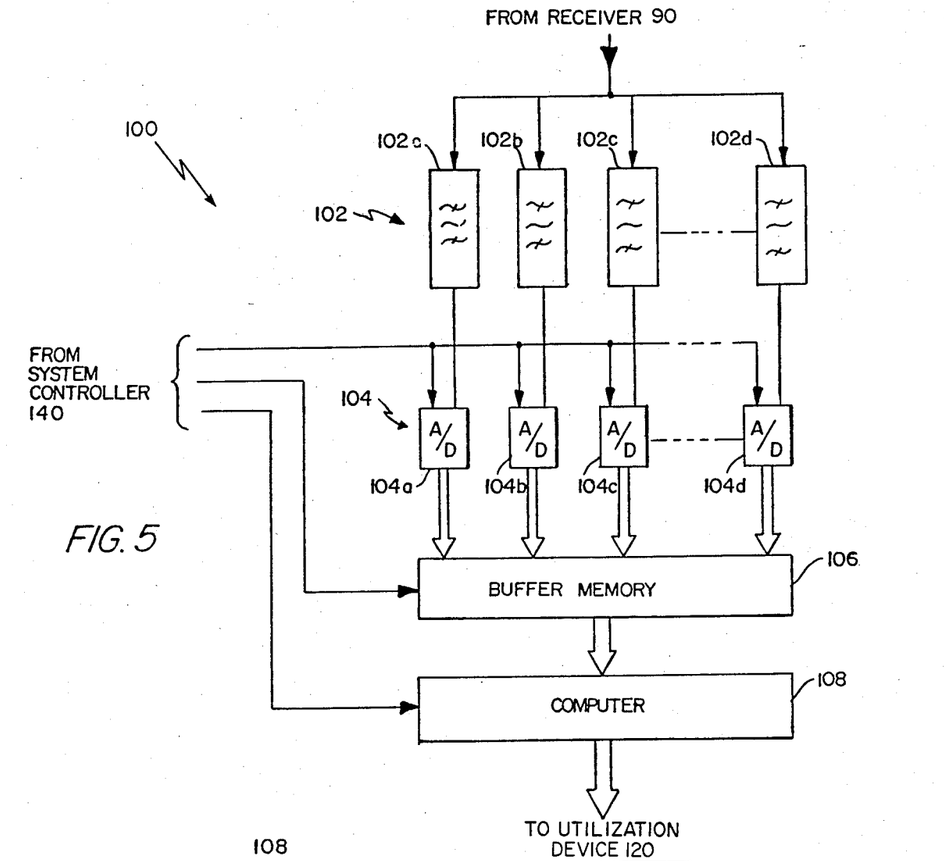
FIG. 5 is a block diagram of the signal processor used in the radar system of FIG. 1.

Referring now to FIG. 5, there is shown one embodiment of signal processor 100. The output signal from receiver 90 is fed in parallel to each individual filter of filter bank 102. The number and bandwidth of the filters are determined by the required range and Doppler shift resolution with a limit imposed by the available coherence bandwidth, as is known in the art. Filters 102 have slightly overlapping passbands, with each respective passband covering respective portions of the frequency spectrum. The analog outputs of filter 102 are coupled to analog-to-digital converters 104, and in response to a strobe signal from system controller 140, are converted to digital signals which are then stored in buffer matrix 106. The strobe signal is produced by system controller 140 at a frequency corresponding to the coherence bandwidth of the laser used, which typically is 100 kHz. The converted signals are coupled to digital computer 108 where they will be processed.

More specifically, the sampled homodyned signals, such as $S_{11}$-$S_{nn}$ in FIG. 6F, are stored in the computer's memory, where they are arranged in separate groups, each group storing the homodyned signals sampled during a corresponding modulation period. Thus, the first group stores samples $S_{11}$-$S'_{1n}$, the second group stores samples $S_{21}$-$S'_{2n}$, etc. Each group is then processed to obtain two average signals, $f_u$ and $f_d$, for the substantially constant frequency components of, respectively, the up-sweep and down-sweep portions of the frequency modulation. Thus, in the first group, samples $S_{11}$-$S'_{1n}$ are used to generate $f_u$ and samples $S'_{11}$-$S'_{1n}$ are used to generate $f_d$. The reason for generating these two values is that for a moving target, its Doppler velocity component is superimposed on the range-indicating signal. However, using the two signals, $f_u$ and $f_d$, the Doppler velocity and range components may be resolved, as is well known.

For obstacle avoidance applications, the system will normally be installed in a moving craft and will result in a homodyned signal in which the Doppler frequency component $f_d$ is greater than the range frequency component $f_r$. Thus, the Doppler frequency component can be computed from the two average signals by halving the difference between the up-sweep signal and the down-sweep signal, while the range frequency is computed by halving the sum of the up-sweep and down-sweep signals, i.e. $f_r = \frac{1}{2}(f_u - f_d)$ and $f_r = \frac{1}{2}(f_u + f_d)$. The range and Doppler velocity are then computed from their respective components, as is well known in the art. See, for example, pages 86-90 of the textbook "Introduction to Radar Systems" by M. I. Skolnik, McGraw-Hill Book Company Inc., New York, 1962. The corresponding range and speed information, as well as target bearing available from syncronizers 135 and 137, is directed to utilization device 120. Intensity information may be additionally used in imaging applications.

Figure 7:
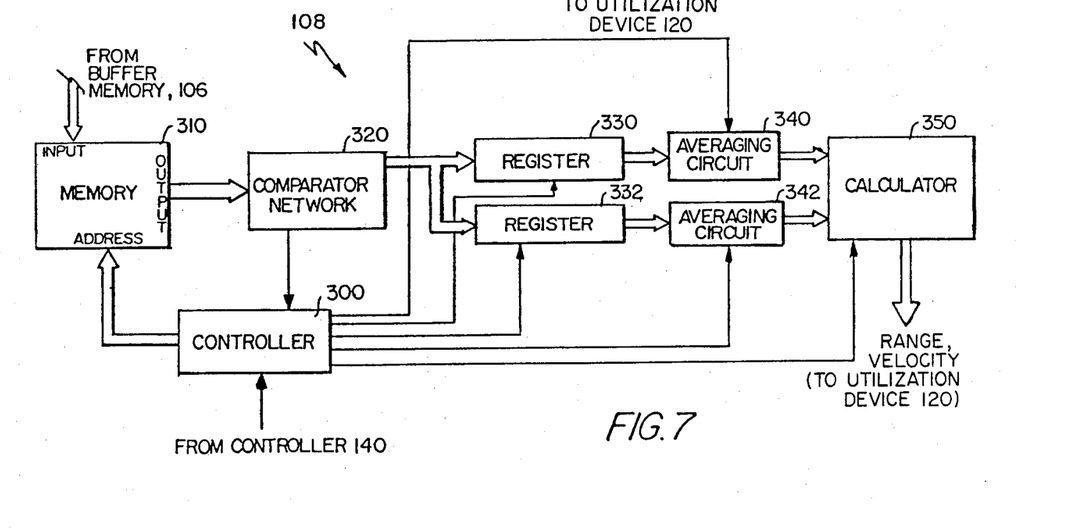
FIG. 7 is a diagram of a computer used in the signal processor of FIG. 5.

Referring now to FIG. 7, there is shown a block diagram for a hardware implementation of the processing scheme just described. The sampled data are routed from buffer memory 106 to memory 310 by controller 300. The data is stored in memory 310 in groups, each group corresponding to the beat signals sampled during a predetermined modulation period. While continuing to store samples corresponding to the beat signal generated during the next modulation period, controller 300 controls the processing of each group by sequentially comparing, in comparator network 320, adjacent samples of the current group in order to separate the constant beat frequency samples into two registers, 330 and 332, and ignore the non-constant frequency samples. The first register 330 contains the constant frequency samples of the beat frequency during the up-sweep portions of the modulation period, for example $S_{16}$-$S_{1n}$ in FIG. 6F, and the second register 332 contains the constant frequency samples of the beat frequency during the down-sweep portion of the modulation period, for example samples $S'_{13}$-$S'_{1n}$ also shown in FIG. 6F. The samples stored in registers 330 and 332, are then separately averaged in averaging circuits, 340 and 342. The two resulting averaged signals $f_u$ and $f_d$ are then fed into calculator 350 where the range and Doppler shift of any target detected are calculated, as is well known.

In order to better understand the improvement of the present invention, the following quantitative example will be considered. Using an aperture of afocal telescope 50 equal to 5 cm and the 10.6 micron $CO_2$ laser transition results in a system beam width of approximately 0.25 mr, i.e. each footprint has an angular extent of 0.25 mr. For an obstacle avoidance mission, an elevation field of 20° and an azimuth field of 5° might typically be required. The azimuth and elevation scan lines are spaced at 5 mr intervals, and 20 consecutive footprints in any given line from a resolution cell. Since each footprint has an extent of 0.25 mr, each resolution cell has an angular extent of 0.25 mr by 5 mr. For a scanning rate of approximately 300°/sec., the time on target (t.o.t.) for each resolution cell will be about 1 msec, and (t.o.t.) for each footprint approximately 50 microseconds. A triangular frequency modulation rate of 1 kHz allows for the efficient detection of energy for each 5 mr range cell, since the returns from the 20 footprints will be efficiently homodyned with the CW transmitted beam. For the 20°×5° scan field and 5 mrad range cells, there are $N_r = \theta_{el}\theta_{az}/(\Delta\Phi)^2 = 1200$ resolution cells, where elevation scan in degrees, $\theta_{az}$=azimuth in degrees and $\Delta\Phi$=resolution cells in degrees. Thus, for a scanning pattern similar to that of FIG. 4, each scanning frame takes 1.2 sec. and the two orthogonal frames result in a total frame time of 2.4 sec.

The S/N ratio may be expressed as $$S/N = (n\pi P_T \rho_T D^2 n_s n_a)/32h\nu BR^2$$

where
n=quantum efficiency (60% for a Mercury Cadmium Telluride Detector)
$P_T$=transmitter power 5 watts
$\rho_T$=target reflectivity 0.1
D=aperture diameter ($5 \times 10^{-2}$ meters) aperture efficiency=0.5
$h\nu = 1.9 \times 10^{-20}$ joules
B=coherence bandwidth ($10^5$ Hz)
$n_A$=atmospheric transmission ($e^{-2\alpha R}$)
$\alpha$=extinction coefficient (0.25) 1 dB/KM
$n_S$=system efficiency (0.04)
$S/N = (1.6 \times 10^3 e^{-2\alpha R})/R^2$ (Km)

The S/N ratio for various ranges in a 1 dB/km environment is approximately given in the following table:

| R(KM) | $S/N_{(IN)}$ |
|---|---|
| 1 | 29 dB |
| 2 | 21 dB |
| 3 | 15 dB |
| 4 | 11 dB |
| 5 | 7 dB |
| 6 | 1.9 dB |
| 7 | −2 dB |

For a typical laser having a coherence bandwidth of 100 kHz, the coherent detection is performed in 10 microsecond intervals. The present invention, by integrating a plurality of consecutive footprints, allows the improvement of the post detection S/N ratio by increasing the integration time. For a target present throughout the modulation period, the integrated time on target, T, corresponding to samples of constant beat frequency is then given by the overall time on target minus the round trip propagation delay, or $T = nT_s - dt$, where n is the number of footprints scanned during each modulation period, $T_s$ is the time on target per footprint, and dt is the round trip propagation delay. In this example, the overall time on target is equal to the 20 footprints that are part of each resolution cell times the time on target for each footprint, i.e. 20×50 microseconds or 1000 microseconds per resolution cell. The resolution trip propagation delay, dt, depends on the actual range of the target within the maximum unambiguous range, and thus if a function of range. For a 100 kHz bandwidth, the corresponding integration time is 1000 microsecond minus dt, thus allowing the integration of almost 100 independent samples. The integration improvement achieved by the system of the present invention is then related by $$S/N \text{ integrated} = 10 \text{ Log } (BW \times T) - L_{in} + S/N_{in}$$

where
BW=coherence bandwidth
T=integration time
$S/N_{in}$=input S/N ratio
$L_{in}$=integration loss For targets at 6 km, S/N input=1.9 dB, BW=100 kHz, T=(1000−40) microseconds and $L_{in}$=9 dB, thus each range cell at 6 Km has approximately a 12.9 dB integrated S/N ratio in a 1 dB/Km environment.

The chirp rate, is equal to the minimum detectable frequency divided by the time required for the round trip propagation to the minimum detectable range. For a system bandwidth of 100 kHz and a minimum range of 500 meters (33 microseconds round trip time), the chirp rate is approximately equal to 30 kHz/microseconds. For a modulation period of 1 msec and a triangular waveform, the resulting maximum frequency excursion equals approximately 15 MHz. This is well within the capability of many lasers.

It is understood that the above described embodiments of the invention are illustrative only and that modifications thereof may occur to those skilled in the art. For example, even though one possible implementation of system processor 100 has been described, other known implementations may be used. Accordingly, it is desired that this invention is not to be limited to the embodiments disclosed herein but is to be limited only as defined by the appended claims.

What is claimed is:
1. In combination:
means for generating an electromagnetic beam of continuous wave energy with a predetermined beamwidth;
means for frequency modulating said continuous wave energy;
means for scanning said modulated beam of continuous wave energy through a predetermined region;
wherein the frequency modulating means modulates the frequency of the continuous wave energy in a modulation period greater than the time said frequency modulated beam is scanned through portion of the predetermined region equal to said beamwidth;
means for receiving portions of said frequency modulated beam of continuous wave energy reflected by a target; and
means for determining the range of the target, said target range determining means comprising means for mixing said received, target-reflected portions with an instantaneous portion of said frequency modulated beam of continuous wave energy to produce a beat signal having a frequency representative of the range of the target.

2. The combination of claim 1 wherein said target range determining means additionally comprises:
means for averaging samples of said beat signal during a portion of said modulation period to produce an output signal having a value representative of the range of the target.

3. The combination of claim 1 wherein said target range determining means further comprises:
means, responsive to the frequency of the beat signal, for determining the Doppler speed of said target.

4. The combination of claim 3 further comprising:
means, responsive to said beat signal, fo determining the intensity of said received, target reflected signal portions.

5. The combination of claim 3 further comprising:
means, responsive to a control signal from said scanning means, for determining the angular position of said target.

6. In combination:
means for producing an electromagnetic beam of continuous wave energy having a predetermined carrier frequency and a predetermined beamwidth $\Delta\theta$;
means for modulating the carrier frequency of said continuous wave energy in a predetermined modulation period $T_m$;
means for directing said beam through a predetermined region at a predetermined rate W, the modulation period $T_m$ being equal to or greater than a time $T_s$, where $T_s = (\Delta\theta)/W$;
means for receiving portions of said modulated beam of energy reflected by a target;
means for mixing said target reflected portions with an instantaneous portion of said modulated beam to produce beat frequency signals having frequencies representative of the range of the target;
means for producing an average signal for said beat frequency signals during at least a portion of said modulation period; and
means, responsive to the average signal, for computing the range of the target.

7. The combination of claim 6 further comprising:
means for integrating a predetermined number of said homodyned signals corresponding to returns from adjacent beam positions.

8. The combination of claim 6 further comprising means for computing the Doppler speed of the target from said average signal.

9. In combination:
means for generating an electromagnetic beam of continuous wave energy having a predetermined carrier frequency;
means for frequency modulating said carrier frequency;
means for scanning said modulated beam of continuous wave energy through a field defining a predetermined number of resolution cells, portions of the scanned beam being reflected by a target located in at least one resolution cell, each one of said resolution cells comprising a region equivalent to a predetermined number of adjacent beam footprints, the modulation period being approximately equal to the time needed to scan through said one of said resolution cells;
means for mixing said target reflected beam portions with an instantaneous portion of said frequency modulated beam to produce beat frequency signals for each one of said resolution cells in which the target is located, the frequency of said beat frequency signals being a function of the range and Doppler speed of said target; and
means, responsive to the beat frequency signals, for determining the range and Doppler speed of the target.

10. The combination of claim 9 wherein:
said target range and Doppler speed determining means comprises means for averaging the beat frequency signals during at least a portion of said modulating period.

11. In combination:
means for generating an electromagnetic beam of continuous wave energy having a predetermined carrier frequency;
means for scanning said beam in a predetermined pattern through a predetermined field;
means for receiving returned portions of said scanned beam, said portions being reflected by targets encountered by said beam;
means for mixing said returned portions with an instantaneous portion of said generated beam to produce homodyned signals having a frequencies representative of the respective ranges of the targets;
means for frequency modulating said carrier frequency with a modulation period greater than the time required for scanning said generated beat of continuous wave energy through a predetermined number of consecutive beam positions; and
means, responsive to the homodyned signals, for computing the respective ranges of the targets from the frequencies of the homodyned signals.

12. The combination of claim 11 further comprising:
means for integrating a plurality of samples of said homodyned signals during said modulation period.

13. The combination of claim 11 wherein the frequencies fo the homodyned signals are additionally representative of the respective Doppler speeds of the targets, and further comprising means, responsive to the homodyned signals, for computing the respective Doppler speeds of the targets from the frequencies of the homodyned signals.

14. A laser system comprising:
means for generating an electromagnetic beam of continuous wave energy having a predetermined carrier frequency;
means for frequency modulating said carrier frequency of continuous wave energy;
means for scanning said modulated beam of continuous wave energy in a predetermined field;
means for receiving portions of said scanned beam reflected from targets in said field;
means for generating a homodyned signal, comprising means for mixing said received beam and an instantaneous portion of said modulated beam of continuous wave energy;
means for controlling said modulating means for setting the modulation period equal to the time needed to scan a selectable number of consecutive beam positions;
.means, responsive to the frequency of the homodyned signal, for producing output signals having values corresponding to the ranges and Doppler speeds of the targets, said producing means comprising means for integrating successive samples of said homodyned signal during each modulation period; and means, responsive to said output signals, for determining the ranges and Doppler speeds of said targets.

15. The system of claim 11 wherein:

said scanning means sweep said modulated beam of continuous wave energy through said field in parallel lines along two orthogonal directions, the separation of said line being approximately equal to the size of a minimum detectable target.

16. The system of claim 14 wherein:

said scanning means sweep said beam across a field of predetermined size in parallel sweeps which are separated by a maximum predetermined amount which is a function of a minimum detectable target, said sweeps taking place along two orthogonal directions said scanning taking place first in one direction along said field and then in another direction orthogonal to said first direction.

17. A laser system comprising:

means for producing a beam of continuous wave electromagnetic energy with a predetermined beamwidth, the continuous wave energy having a nominal frequency;

means for changing the frequency of the continuous wave energy from the nominal frequency over a predetermined bandwidth in a first time interval;

means for sweeping the beam through a predetermined region in a second time interval, said first time interval being equal to or greater than said second time interval;

means for receiving a portion of the swept beam reflected from targets present in said region;

means for producing an output signal corresponding to the respective ranges of said targets, said producing means comprising means for mixing the received beam with an instantaneous portion of the swept beam to produce an intermediate signal having a frequency representative of the ranges of said targets;

means for integrating said intermediate signal over at least a portion of said first time interval to produce the output signal; and means, responsive to the output signal, for determining the respective ranges of the targets.

18. The laser system of claim 17 further comprising means, responsive to the output signal, for determining the respective Doppler speeds of the targets.

* * * * *